United States Patent
Atwater et al.

(10) Patent No.: US 8,900,756 B1
(45) Date of Patent: Dec. 2, 2014

(54) SOLID STATE PREPARATION METHOD FOR LITHIUM MANGANESE OXIDE $AB_2O_4$ BATTERY CATHODE

(75) Inventors: Terrill B. Atwater, North Plainfield, NJ (US); Paula C. Tavares, Tinton Falls, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 757 days.

(21) Appl. No.: 13/081,976

(22) Filed: Apr. 7, 2011

(51) Int. Cl.
*H01M 4/13* (2010.01)
*C01G 45/12* (2006.01)

(52) U.S. Cl.
USPC ................... 429/231.95; 423/599

(58) Field of Classification Search
USPC ............. 429/224, 231.95; 252/521.5, 182.15; 423/466, 490, 639, 599, 179.5
See application file for complete search history.

(56) References Cited

U.S. PATENT DOCUMENTS

| | | | |
|---|---|---|---|
| 5,135,732 A | 8/1992 | Barboux et al. | |
| 5,753,202 A | 5/1998 | Wang et al. | |
| 6,087,042 A | 7/2000 | Sugiyama et al. | |
| 6,613,479 B2 * | 9/2003 | Fukuzawa et al. | 429/231.95 |
| 8,603,369 B2 * | 12/2013 | Ito et al. | 252/521.2 |

FOREIGN PATENT DOCUMENTS

JP 2006190556 * 7/2006

* cited by examiner

*Primary Examiner* — Ula C. Ruddock
*Assistant Examiner* — Thomas H. Parsons
(74) *Attorney, Agent, or Firm* — Azza Jayaprakash (57) ABSTRACT

A fluorine-modified lithium manganese-based $AB_2O_4$ spinel cathode material is provided. Furthermore, a lithium or lithium ion rechargeable electrochemical cell is provided incorporating fluorine-modified lithium manganese-based $AB_2O_4$ spinel cathode material in a positive electrode. In addition, a process for preparing a stable fluorine-modified lithium manganese-based $AB_2O_4$ spinel cathode material is provided.

6 Claims, 13 Drawing Sheets

SOLID STATE PREPARATION METHOD FOR LITHIUM MANGANESE OXIDE $AB_2O_4$ BATTERY CATHODE

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of electrochemical power sources and, more particularly, to rechargeable lithium and lithium-ion batteries using manganese-based materials as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_yCo_zO_2$.

Today, rechargeable lithium batteries are used in portable electronic devices including cellular phones and laptop computers. Future uses of rechargeable lithium battery systems are targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as a cathode material in lithium electrochemical systems. MnO2 is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures are denoted by $\alpha$, $\beta$, $\gamma$, and $\lambda$. In lithium electrochemical cells, the active material is bound to an aluminum current collector with either Teflon or pVdF mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additional external forces including elevated temperatures also promote cathode fracture; and structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which results in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can create problems. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and are referred to by the following prefixes: $\alpha$, $\beta$, $\gamma$, and $\lambda$. $\alpha$-$MnO_2$ is the most stable $MnO_2$ structure. $\alpha$-$MnO_2$ is one-dimensional and the lattice contains both one by one and two by two channels for lithium insertion/extraction. $\beta$-$MnO_2$ is a tetragonal structure with the lattice containing one by one channels for lithium insertion/extraction. $\gamma$-$MnO_2$ is also one-dimensional, existing in both hexagonal or orthorhombic crystal structures with a lattice that contains one by two channels for lithium insertion/extraction. Because of their stability $\alpha$-$MnO_2$, $\beta$-$MnO_2$, and $\gamma$-$MnO_2$ are not considered rechargeable. However, cycling of lithium into the α-MnO$_2$, β-MnO$_2$, and γ-MnO$_2$ lattice can be achieved with rigid stoichiometric control.

Conventionally, λ-MnO$_2$ is considered the preferred MnO$_2$ based cathode material for rechargeable lithium electrochemical systems. λ-MnO$_2$ is created through the delithiation of Li$_x$Mn$_2$O$_4$ AB$_2$O$_4$ spinel. The λ-MnO$_2$ crystal structure is maintained through both the charge and discharge of the LiMn$_2$O$_4$ spinel. The maintenance of the λ-MnO$_2$ structure during insertion and extraction of lithium in the Li$_x$Mn$_2$O$_4$ spinel makes it an attractive couple with lithium for rechargeable electrochemical systems. The λ-MnO$_2$ crystal structure is a three dimensional cubic array. This crystal structure promotes mechanical stability and adequate pathways for lithium insertion/extraction. Degradation of the λ-MnO$_2$ crystal structure forming α, β or γ-MnO$_2$ crystals and other Mn$_x$O$_y$ phases reduces the capacity of the cathode material.

As lithium intercalates, the size and orientation of the crystal structures change. In Li$_x$Mn$_2$O$_4$ spinel materials, when 0.05<x<1, the crystal structure is cubic (λ-MnO$_2$). When 1<x<1.8, the structure of Li$_x$Mn$_2$O$_4$ (no longer a AB$_2$O$_4$ spinel) is tetragonal. Additionally, when x<0.05, phase transition to the more stable α, β and γ MnO$_2$ can occur. Continued charge and discharge promotes the transformation of the cubic crystal structure to other cubic, tetragonal, and monoclinic phases. Tetragonal and monoclinic crystal structures may become inactive leading to the loss of active cathode material. Voltage control, maintaining 0.05<x<1, allows for the mitigation of the formation of unwanted crystal structures.

When the potential of the lithium/Li$_x$Mn$_2$O$_4$ electrochemical system is maintained between 3.0 and 4.25 volts, the cubic phase is maintained. When the potential of the system drops below 3.0 volts, the Li$_x$Mn$_2$O$_4$ cathode material undergoes a phase change from cubic to tetragonal. When the potential of the system increases above 4.25 volts, the Li$_x$Mn$_2$O$_4$ cathode material becomes stripped of the lithium component and undergoes a phase change from cubic (λ-MnO$_2$) to the more stable α, β and/or γ MnO$_2$.

Other phase transitions that lead to capacity fading include the formation of Mn$_2$O$_3$ and Mn$_3$O$_4$. The Mn$_2$O$_3$ and Mn$_3$O$_4$ formations result from the liberation of oxygen in the MnO$_2$ and Mn$_2$O$_4$ structures. The valence state of manganese in these structures is 3+ or less. This lower valence state creates a stable crystal structure that is not conducive to lithium intercalation and, therefore, not rechargeable. As more Mn$_2$O$_3$ and Mn$_3$O$_4$ are formed, less MnO$_2$ and Mn$_2$O$_4$ remain and the usefulness of the cathode decreases.

Thus, one of the disadvantages of conventional lithium manganese-based AB$_2$O$_4$ spinel materials is the limited cycle life and limited rate capability for lithium electrochemical systems. Furthermore, this problem is a major obstacle for rechargeable lithium battery technology. An additional limiting factor for lithium manganese-based AB$_2$O$_4$ spinel materials is the time required to process the raw materials and synthesize the desired product; conventional methods require multiple mixing, grinding and calcining steps, which take a time period of days to complete.

SUMMARY OF THE INVENTION

The present disclosure resolves the aforementioned problems associated with conventional processes for preparing lithium manganese-based AB$_2$O$_4$ spinel material. By introducing fluorine into the starting material mixture, the synthesis process time of lithium manganese-based AB$_2$O$_4$ spinel materials is dramatically reduced. In contrast to conventional preparation methods, the addition of fluorine in the formulation and fabrication process reduces the processing time by at least an order of magnitude. While conventional preparation methods take from 48 to 72 hours, the preparation method according to the present disclosure may take less than 4 hours. In addition, the preparation method according to the present disclosure is performed at relatively low temperatures, affording better control and high yield rates by minimizing temperature gradients within the mixture during processing. Furthermore, the cycle life of the lithium cells fabricated using the present spinel material is significantly longer than cells fabricated using conventional lithium manganese-based AB$_2$O$_4$ spinel materials.

According to an exemplary embodiment of the present disclosure, a stable lithium manganese-based AB$_2$O$_4$ spinel material is synthesized using a fluorine-modified process and produces a Li$_x$Mn$_2$O$_4$ cathode material that may be employed as a positive electrode for lithium and lithium ion rechargeable electrochemical cells and batteries. The general formula for the material is Li$_x$Mn$_2$O$_4$ (F$_3$), where x≈1 and the reversible region for x for the Li/Li$_x$Mn$_2$O$_4$ electrochemical couple ranges from 0.05 to 1.9 and y ranges from 0.005 to 0.70.

In one embodiment, a method of preparing a fluorine-modified lithium manganese-based AB$_2$O$_4$ spinel cathode material includes mixing a fluorine-containing lithium organic salt, a manganese compound, and a lithium compound to produce a homogenous mixture; and calcining the homogenous mixture for a time period no greater than 4 hours at a temperature of at least 350° C.

Another embodiment of the present disclosure is a fluorine-modified lithium manganese-based AB$_2$O$_4$ spinel cathode material prepared using the aforementioned process. In yet another embodiment of the present disclosure, a lithium electrochemical cell includes an anode and a cathode including the present fluorine-modified lithium manganese-based AB$_2$O$_4$ spinel cathode material.

BRIEF DESCRIPTION OF THE DRAWINGS

The accompanying drawings, which are included to provide further understanding of the present disclosure, and are incorporated in and constitute a part of the specification, illustrate preferred embodiments of the present disclosure, and together with the description serve to explain the principles of the present disclosure. The present disclosure will now be described further with reference to the accompanying drawings as follows.

DETAILED DESCRIPTION

Figure 1:
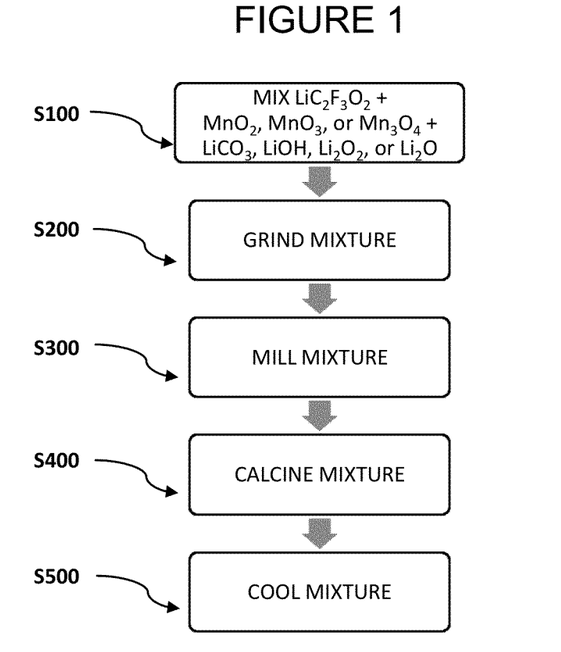
FIG. 1 is a flowchart illustrating process steps in an exemplary embodiment of the present disclosure.

FIG. 1 is a flowchart illustrating process steps in an exemplary embodiment of the present disclosure. More specifically, FIG. 1 shows exemplary steps according to the present disclosure for the preparation of $Li_xMn_2O_4$ material via a solid state reaction. In step S100, a fluorine-containing lithium organic salt is added to a manganese compound and a lithium compound. The stoichiometric ratio of lithium to manganese to fluorine (Li:Mn:F) in the mixture of starting materials ranges from (0.45-0.55):1.0:(0.005-0.35; (0.45-0.55):1.0:(0.015-0.2); or (0.45-0.55):1.0:(0.03-0.15).

Suitable fluorine-containing lithium organic salts include, but are not limited to, lithium trifluoroacetate ($LiC_2F_3O_2$), lithium trifluoromethanesulfonate ($LiCF_3SO_3$), lithium perfluoroorganoacetate, and lithium perfluoroorganosulfonate. Suitable manganese compounds include, but are not limited to, $MnO_2$, $Mn_2O_3$, and $Mn_3O_4$. Additionally, manganese nitrate, manganese hydroxide and manganese acetate are suitable manganese compounds. Suitable lithium compounds include lithium carbonate ($Li_2CO_3$), LiOH, $Li_2O$, and $Li_2O_2$.

In Step S200, the mixture is ground and mixed using a mortar and pestle, alternative grinding and mixing methods include ball milling and high amplitude vibration milling. In Step S300, the mixture is then mixed in a random orbit mixer mill to ensure a homogeneous mixture of the raw materials. Alternatively, other suitable milling systems include stirred media mills and low amplitude vibration mills. Alternatively, step S300 can be removed from the process, if the raw materials are homogenously mixed during step S200. For example, the materials can be homogenously mixed in a ball mill during step S200.

In Step S400, the mixture is calcined in a furnace at 600° C. for 2 hours. Alternatively, suitable calcination temperatures and calcinations times range from 350° C. to 800° C. (for from 1 to 4 hours), from 400° C. to 600° C. (for from 1.5 to 3 hours), or from 500° C. to 600° C. (for from 2 to 2.5 hours). In Step S500, the mixture is cooled at a temperature ranging from 20° C. to 300° C. (for from 1 to 24 hours), from 20° C. to 150° C. (for from 1 to 4 hours), or from 20° C. to 50° C. (for from 1 to 2.5 hours).

The exemplary process described above results in the formulation of a family of fluorine-modified $Li_xMn_2O_4$ $AB_2O_4$ spinel materials. The general formula for the lithium electrochemical cell cathode prepared is $Li_xMn_2O_4(F_y)$, where $x≈1$ and proves to be reversible between 5.2 and 2.0 volts. This reversible region for x in a lithium electrochemical cell comprised of the present disclosure ranges from 0.05 to 1.9 and y ranges from 0.005 to 0.70, from 0.015 to 0.4, or from 0.03 to 0.3.

Figure 2:
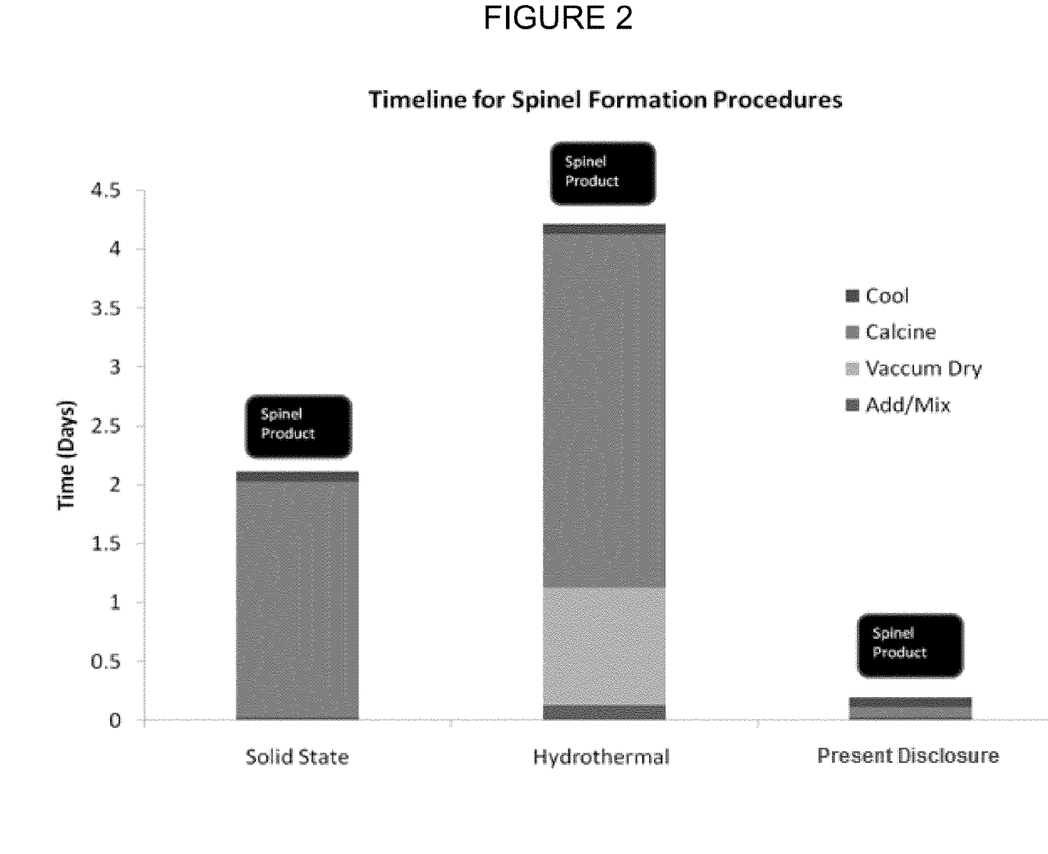
FIG. 2 is a timeline chart contrasting the required fabrication times for an exemplary embodiment of the present disclosure versus conventional preparation methods.
Figure 3:
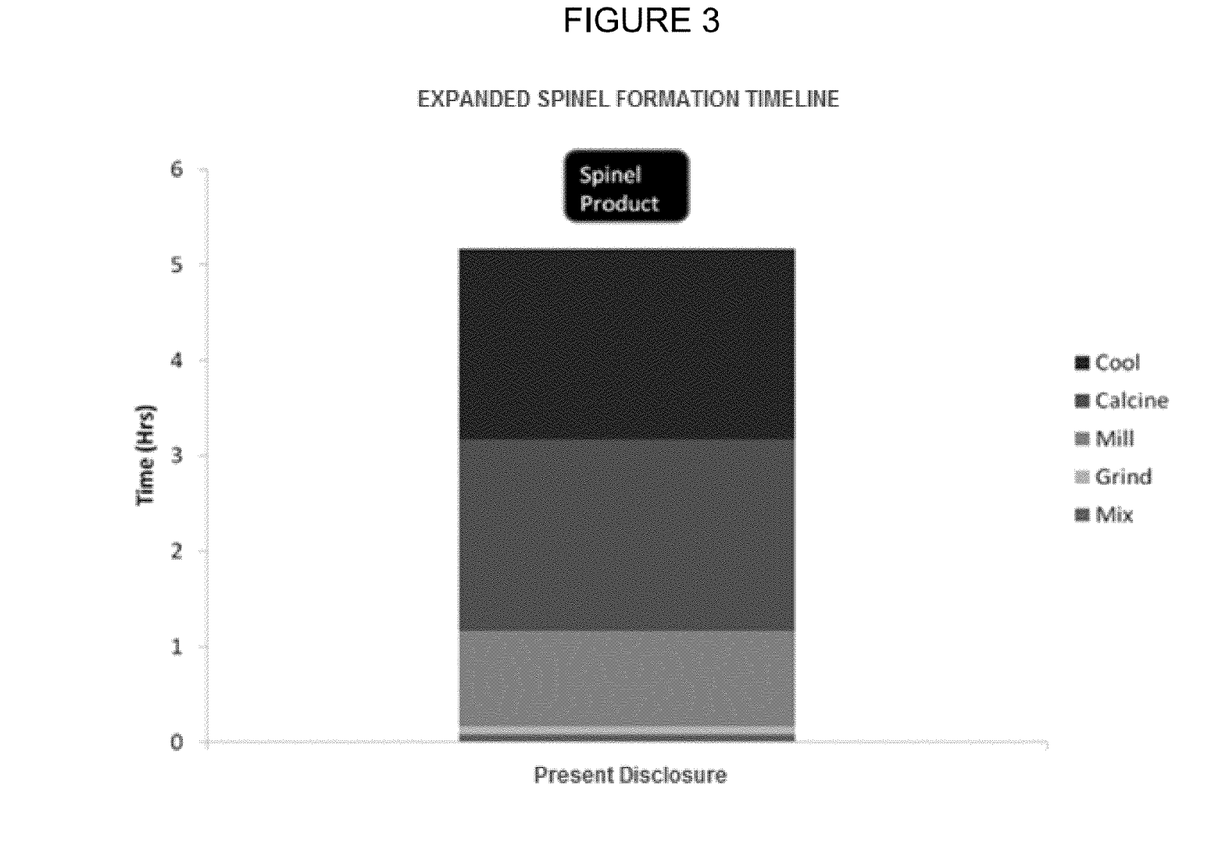
FIG. 3 is an expanded spinel formation timeline chart showing an exemplary embodiment of the present disclosure.

FIG. 2 illustrates steps and timelines for conventional fabrication methods versus the preparation methods provided in the present disclosure. These conventional solid state and hydrothermal fabrication methods are described in U.S. Pat. No. 5,753,202 and U.S. Pat. No. 5,135,732, respectively (which are incorporated by reference in their entirety). FIG. 3 shows an expanded view of the steps of an exemplary method according to the present disclosure. As shown in FIGS. 2 and 3, the entire fabrication process (including cooling time) takes over 2 or 4 days using conventional solid state and hydrothermal methods, respectively. In contrast, the entire fabrication process (including cooling time) may take approximately four hours using the present fabrication method.

Figure 4:
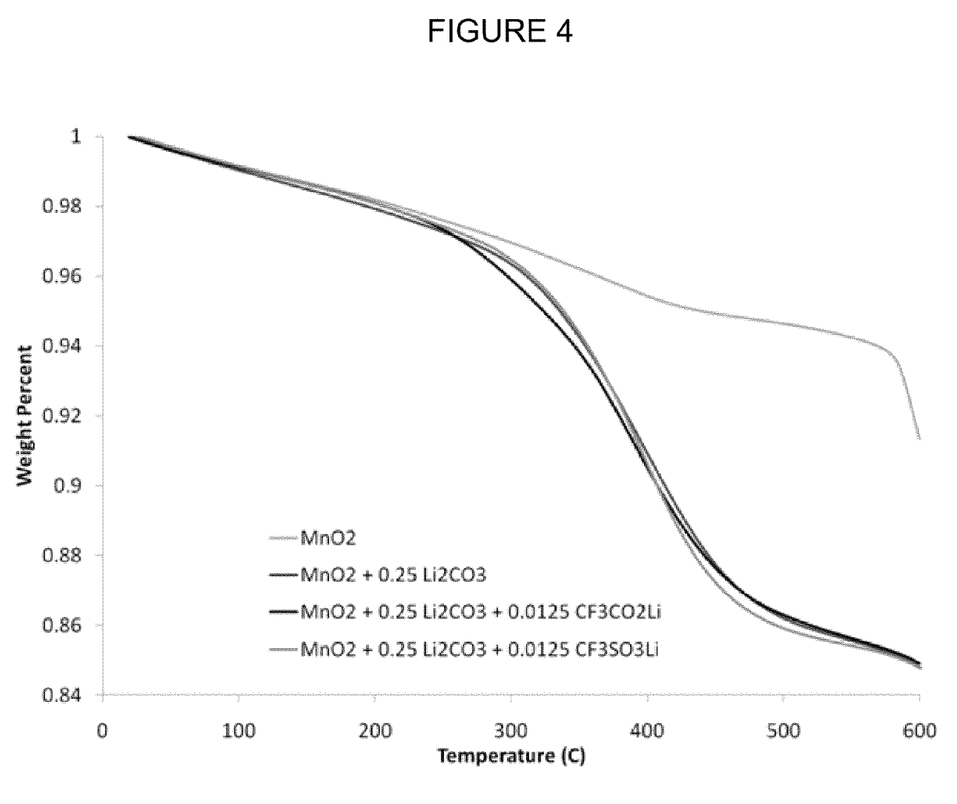
FIG. 4 is a graph showing thermal gravimetric data for starting materials and an exemplary formulation mixture according to exemplary embodiments of the present disclosure.
Figure 5:
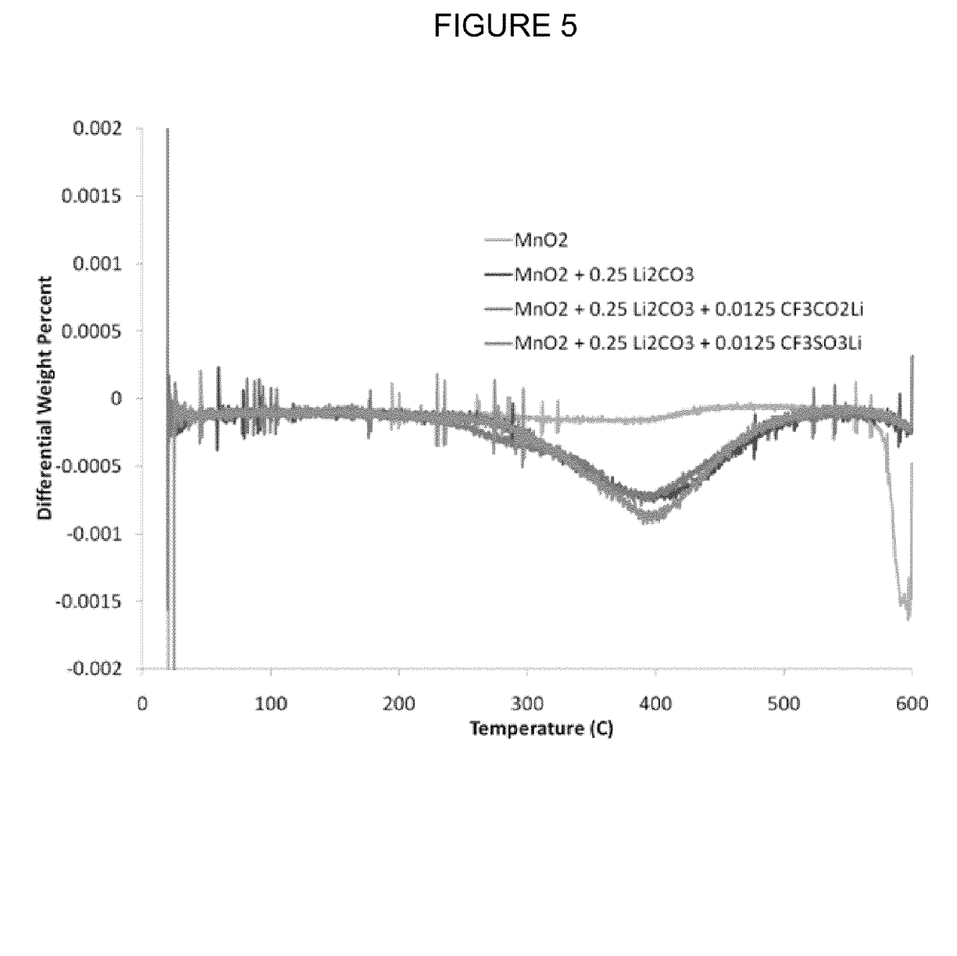
FIG. 5 is a graph showing thermal gravimetric data for starting materials and an exemplary formulation mixture according to exemplary embodiments of the present disclosure.

FIGS. 4 and 5 show the thermal gravimetric data for the starting material mixture for $Li_xMn_2O_4(F_y)$ spinel material according to the present disclosure. In particular, the thermal gravimetric data in FIGS. 4 and 5 represent the formulated mixture where the lithium to manganese to fluorine ratio is 0.5125 to 1 to 0.0375. The data displays the reaction thermodynamics for the conventional art and present disclosure.

In order to evaluate the electrochemical properties of the present fluorine-modified lithium manganese-based $AB_2O_4$ spinel electrochemical system, laboratory coin cells were fabricated using methods described in detail below. Experimental cells may also be fabricated using other methods known in the art, incorporating the fluorine-modified lithium manganese-based $AB_2O_4$ spinel material described in the present disclosure. The experimental cells were composed of a lithium anode separated from a Teflon bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_xMn_2O_{4-y}F_y$, carbon and Teflon in a 83.3:8.3:8.3 weight percent basis, respectively. Suitable conductive carbon materials include, but are not limited to, conductive carbon black (commercially available from various sources, including Cabot Corporation, under the tradename VULCAN XC72 or VULCAN XC72R), graphite, carbon nanofibers, and carbon nanoparticles (commercially available under the tradename PURE BLACK, manufactured by Superior Graphite Co.). Suitable binders include, but are not limited to, polytetrafluoroethylene (commercially available under the trade name TEFLON, manufactured by DuPont), polyvinylidene fluoride (PVDF), and latex. The cathode may contain by weight 40%-95% of $Li_xMn_2O_{4-y}F_y$, 1%-40% of conductive carbon, and 1%-20% binder.

The cathode mix was rolled to 0.06 cm and dried in a vacuum oven. The cathode mass was approximately 0.15 g. The cathode and 0.075 cm thick lithium foil was cut using a 1.58 cm diameter (1.96 $cm^2$) hole punch. A 0.01 cm nonwoven glass separator was used for the separator and as a wick. The electrolyte used was 1 M $LiPF_6$ in proportional mixtures of dimethyl carbonate and ethylene carbonate.

Other suitable electrolytes include, but are not limited to, lithium hexafluoroarsenate monohydrate (LiAsF$_6$), lithium perchlorate (LiClO$_4$), lithium tetrafluoroborate (LiBF$_4$), and lithium triflate (LiCF$_3$SO$_3$).

The cells were cycled with an ARBIN Model MSTAT4 Battery Test System. The charge profile consisted of a constant current charged at 0.25 mA, 1.0 mA, and 2.0 mA to 4.2 volts, 4.5 volts, and 4.75 volts. The cells were discharged at 0.25 mA, 1.0 mA, and 2.0 mA to 3.5 volts and 2.25 volts. A rest period of 15 minutes between cycles allowed for the cells to equilibrate. Prior to cycling, cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

The data shows a stable fluorine-modified lithium manganese-based AB$_2$O$_4$ spinel material was formulated, fabricated, and characterized as a positive electrode suitable for lithium and lithium ion rechargeable electrochemical cells and batteries. The general formula for the present spinel material is Li$_x$Mn$_2$O$_4$(F$_y$), where x ranges from 0.05 to 1.9 and y ranges from 0.005 to 0.70, from 0.015 to 0.4, or from 0.03 to 0.3. The specific capacity for the fluorine-modified lithium manganese-based AB$_2$O$_4$ spinel cathode material was 90 mAh/g, when coupled with lithium and cycled between 3.5 and 4.75 volts. This is comparable to conventional lithium manganese-based AB$_2$O$_4$ spinel materials fabricated over a 48 to 72-hour time span. Yet, the processing time according to the present disclosure has been dramatically reduced to 4 hours or less.

Figure 6:
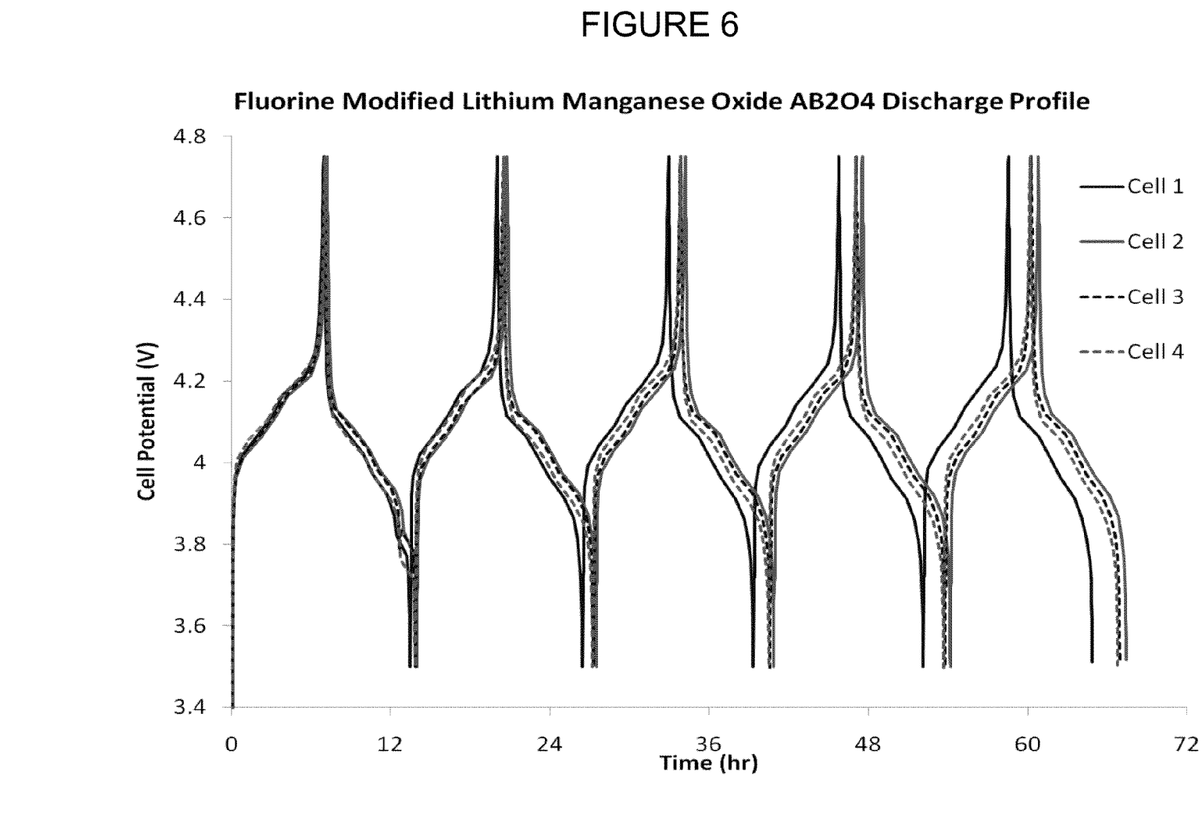
FIG. 6 is a graph illustrating representative cycling (charge/discharge) curves for an exemplary embodiment of the present disclosure.
Figure 7:
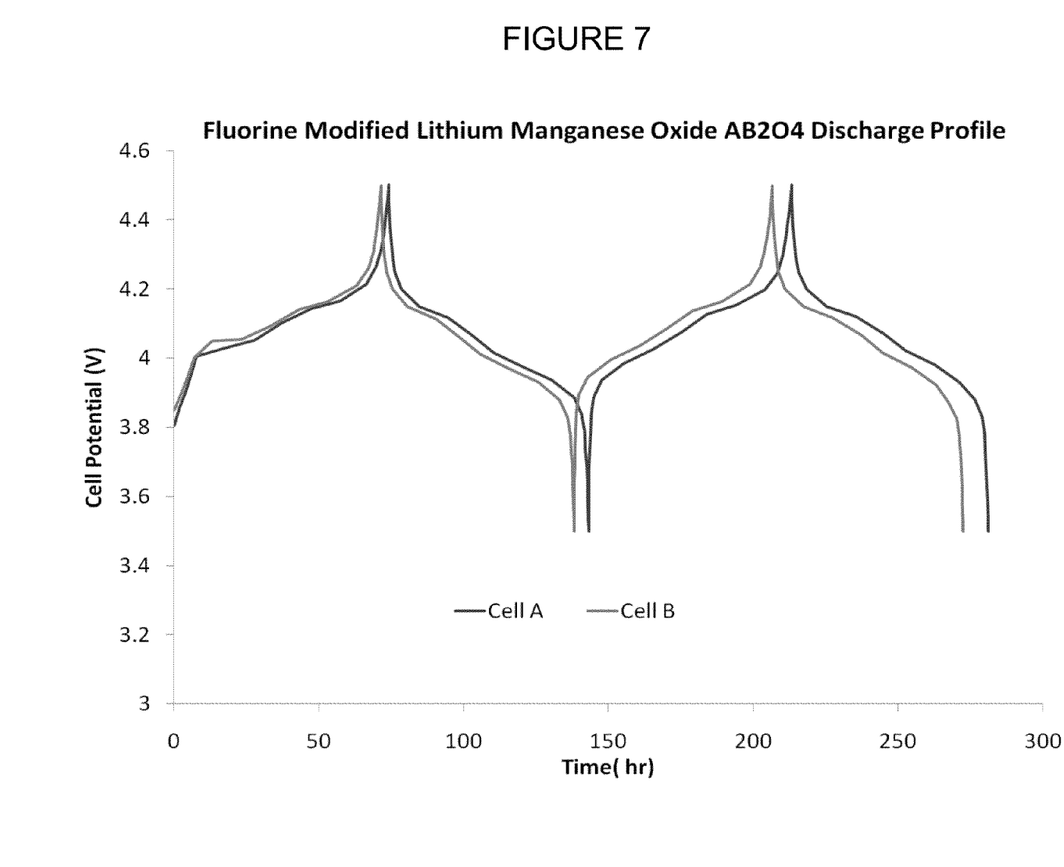
FIG. 7 is a graph illustrating the forming cycle and second charge/discharge curves for a lithium cell according to an exemplary embodiment of the present disclosure.

FIGS. 6 and 7 show galvanostatic (charge/discharge) plots for lithium electrochemical cells fabricated with lithium manganese-based AB$_2$O$_4$ spinel cathode materials, synthesized using the method described in the present disclosure with varying fluorine ratios in the starting material. In FIG. 6, the stoichiometric ratio of fluorine to manganese is 0.08:1.0. In FIG. 7, the stoichiometric ratio of fluorine to manganese is 0.16:1.0. In FIG. 6, experimental cells 1 through 4 are repeated trials using the same experimental protocol; in FIG. 7, experimental cells A and B are repeated trials using the same experimental protocol. The charge and discharge currents were maintained at 1 mA/cm$^2$ and 0.125 mA/cm$^2$, respectively, for the galvanostatic experiments displayed in FIGS. 6 and 7. Furthermore, cells fabricated with the present fluorine-modified lithium manganese-based AB$_2$O$_4$ spinel material have a significantly longer cycle life. Compared to cells fabricated using conventional lithium manganese-based AB$_2$O$_4$ spinel material, the cycle life of the present spinel material ranges from 1.5 to two times longer.

Figure 8:
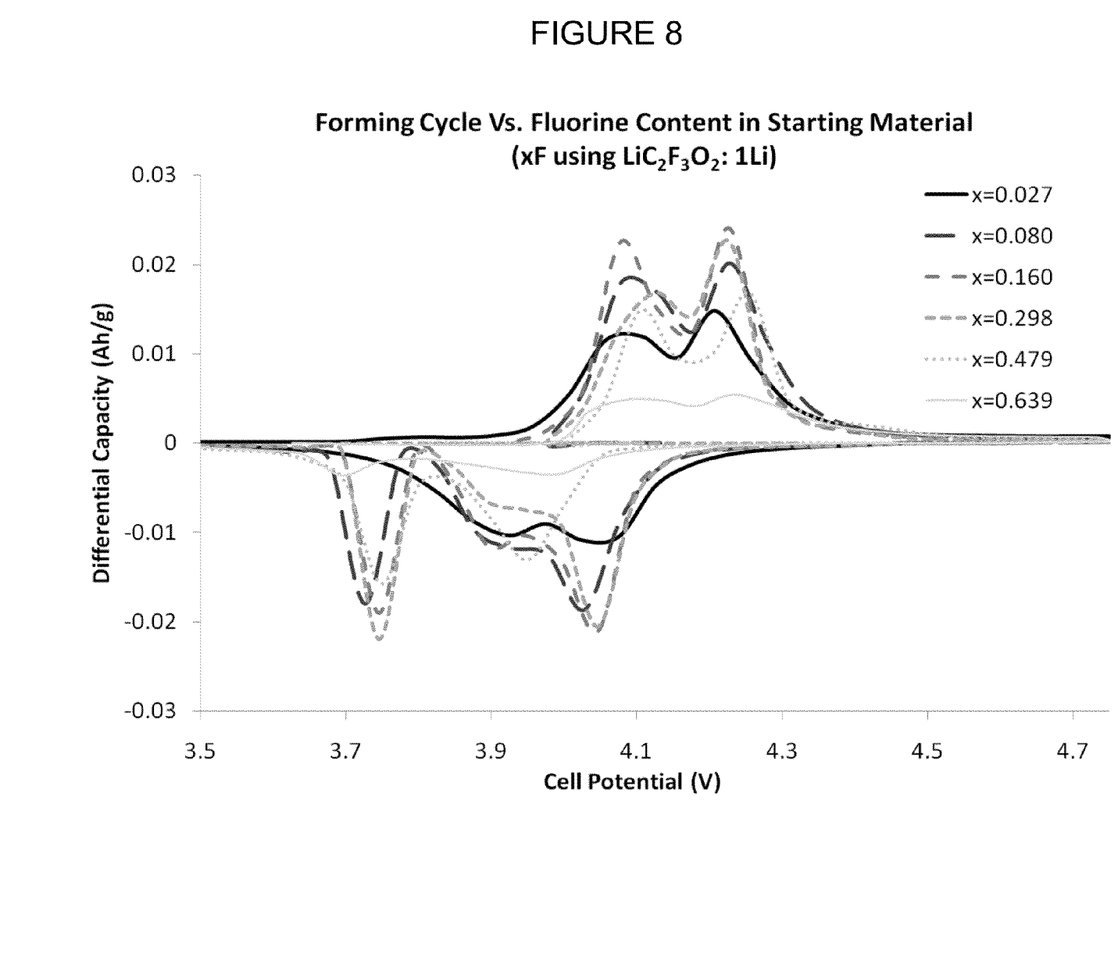
FIG. 8 is a graph illustrating the forming cycle differential capacity traces for a lithium cell containing a fluorine-modified lithium manganese-based $AB_2O_4$ spinel according to an exemplary embodiment of the present disclosure.
Figure 9:
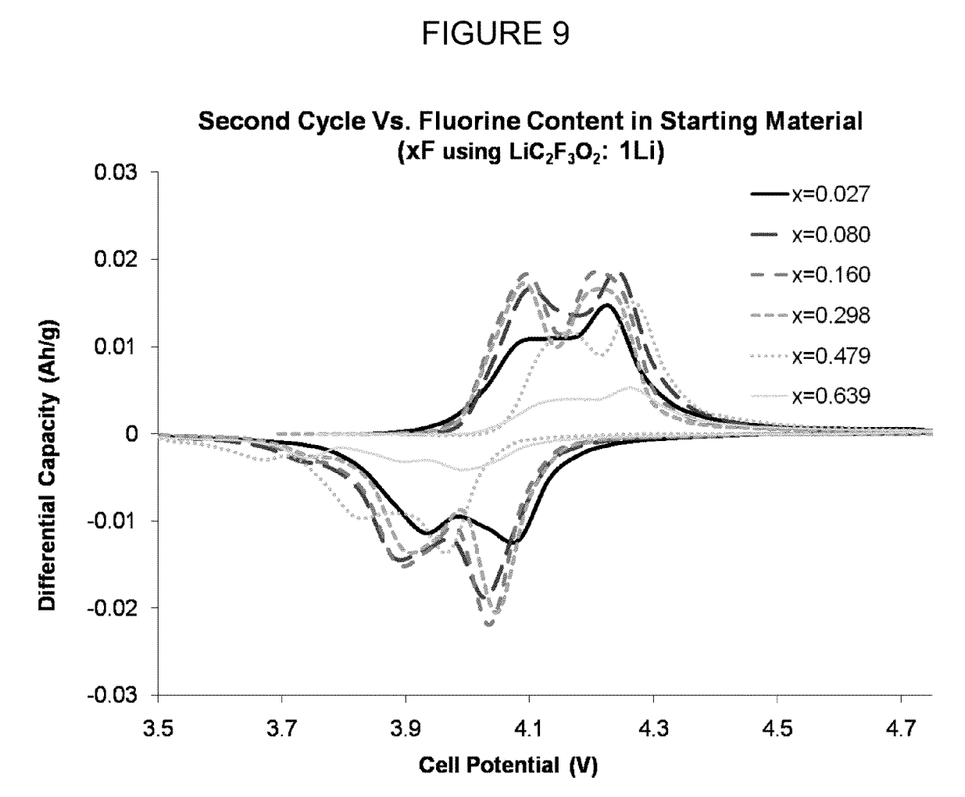
FIG. 9 is a graph illustrating the second cycle differential capacity traces for a lithium cell containing a fluorine-modified lithium manganese-based $AB_2O_4$ spinel according to an exemplary embodiment of the present disclosure.
Figure 12:
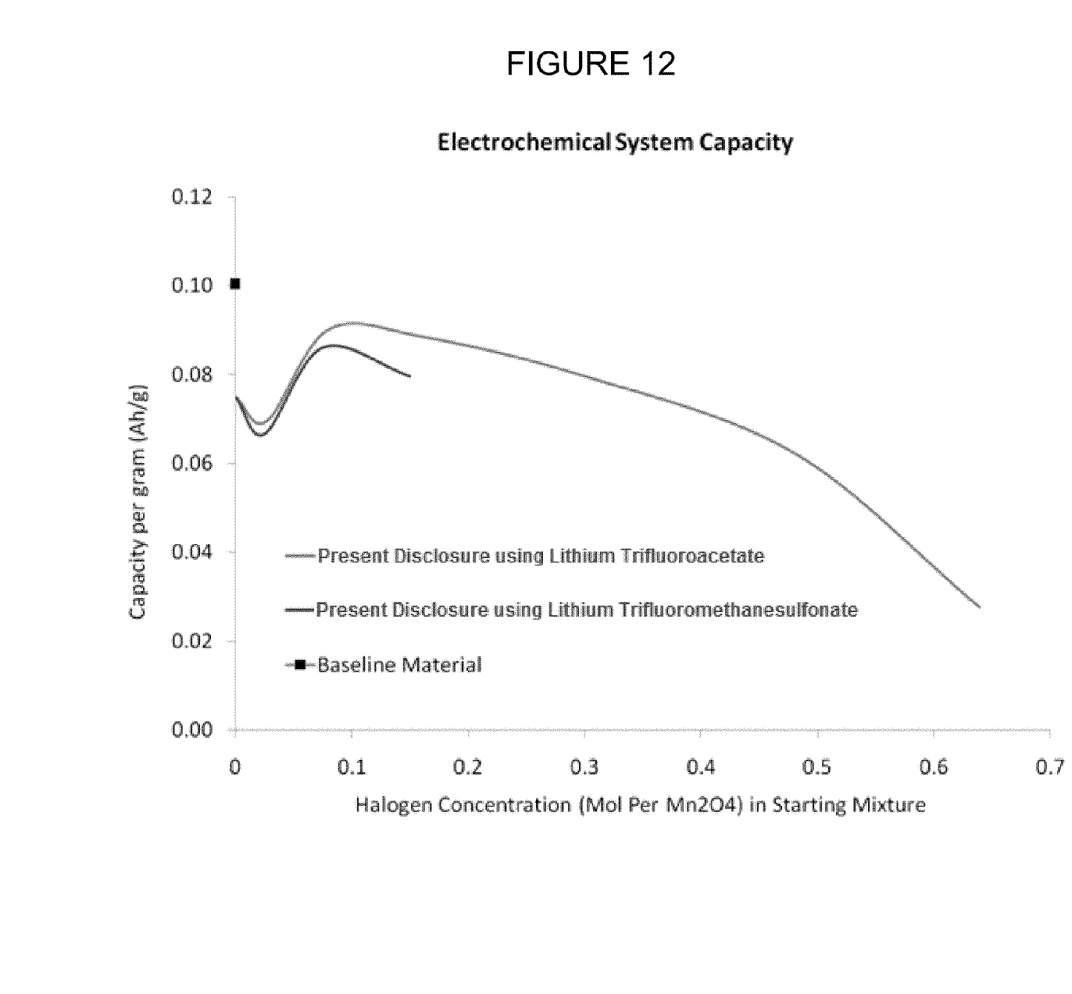
FIG. 12 is a graph illustrating the discharge capacity for a lithium cell containing a fluorine-modified lithium manganese-based $AB_2O_4$ spinel according to an exemplary embodiment of the present disclosure, as a function of fluorine ratio in the starting materials.

FIGS. 8 and 9 show differential capacity traces for cells fabricated with the fluorine-modified lithium manganese-based AB$_2$O$_4$ spinel cathode material, synthesized according to an exemplary method according to the present disclosure. FIG. 12 illustrates the discharge capacity of an exemplary method according to the present disclosure as a function of the fluorine ratio in starting materials. The baseline material referenced in FIG. 12 is an average of capacity delivered of cells made with manufactured LiMn$_2$O$_4$ materials (described in further detail below) and in-house prepared LiMn$_2$O$_4$.

Figure 13:
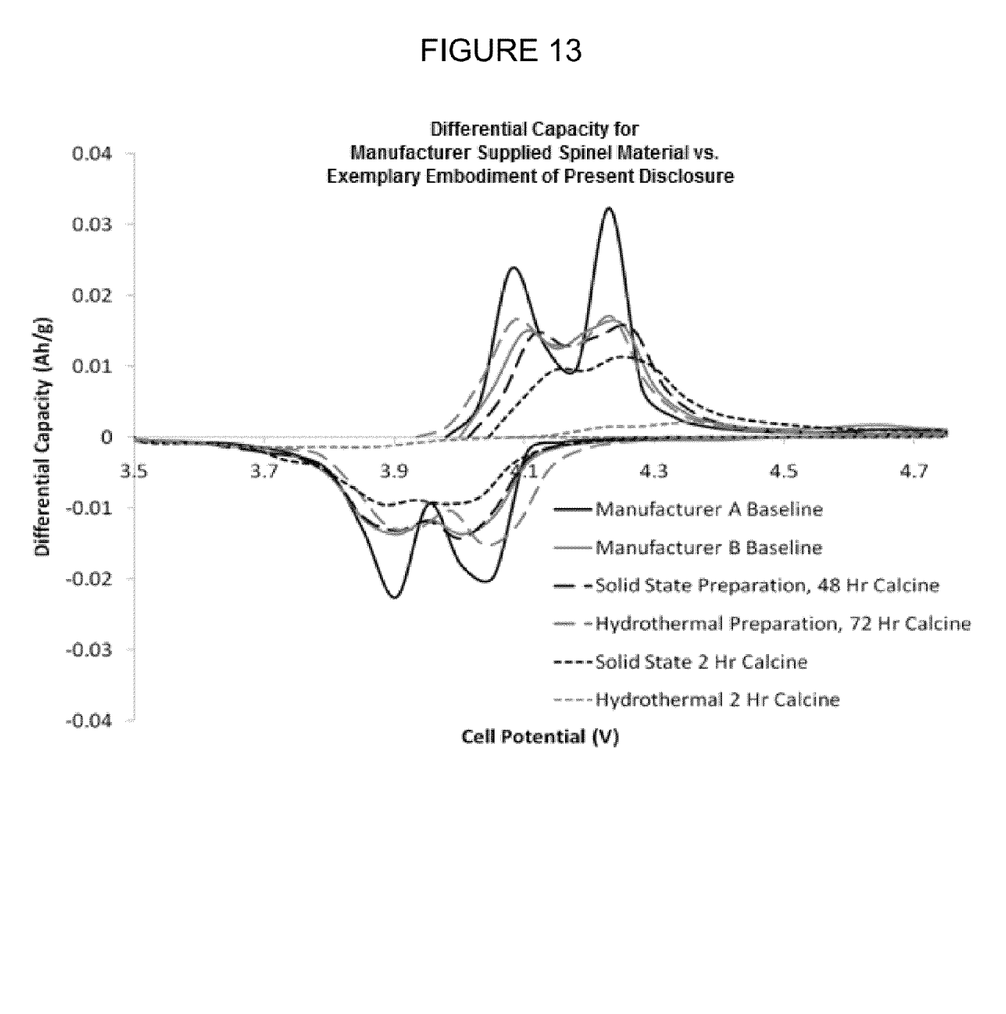
FIG. 13 is a graph illustrating the differential capacity traces for a conventional lithium manganese-based $AB_2O_4$ spinel cycled between 4.75 and 3.5 volts.

FIG. 13 illustrates the differential capacity traces for cells fabricated using manufacturer-supplied lithium manganese-based AB$_2$O$_4$ spinel material. Manufactured LiMn$_2$O$_4$ materials used for this comparison include LiMn$_2$O$_4$ prepared by CERAC, Inc. (L-2010 106252-A-1, labeled "Manufacturer A baseline") and LiMn$_2$O$_4$ manufactured by Johnson-Matthey PLC (labeled "Manufacturer B baseline"). In addition, FIG. 13 contains data from materials synthesized using conventional methods (as described in FIG. 2), where the calcination time was reduced to that of the present disclosure.

Figure 10:
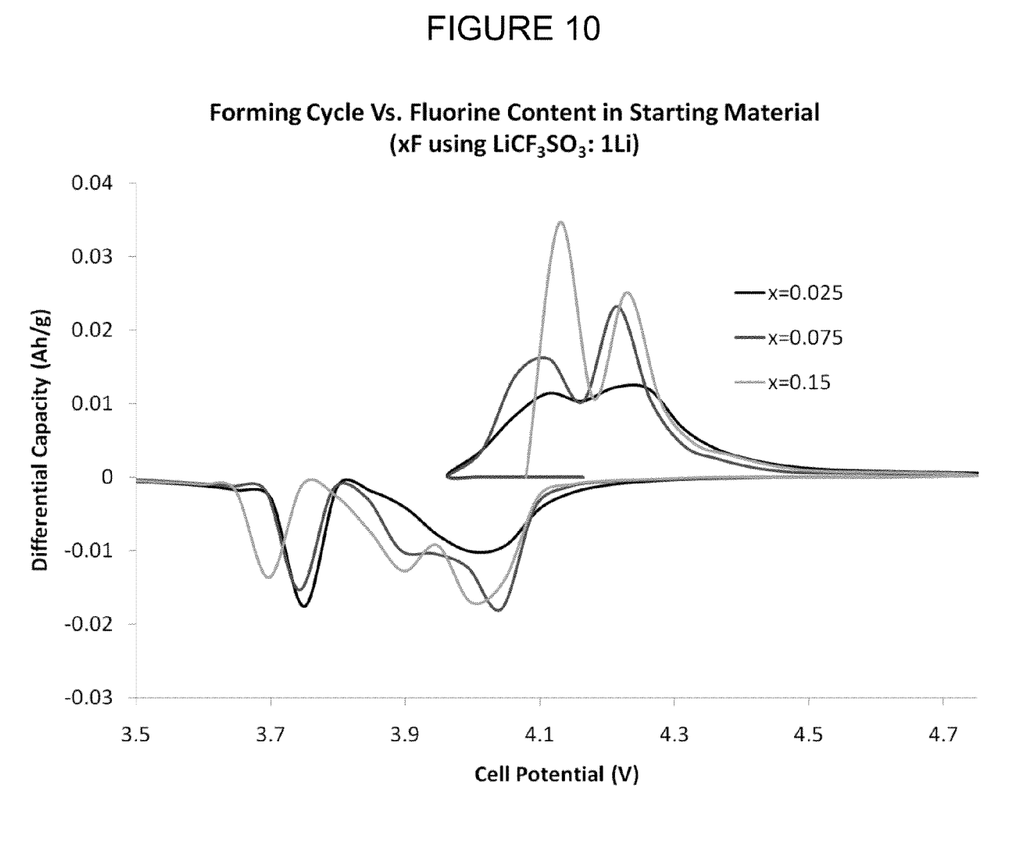
FIG. 10 is a graph illustrating the forming cycle differential capacity traces for a lithium cell containing a fluorine-modified lithium manganese-based $AB_2O_4$ spinel according to an exemplary embodiment of the present disclosure.
Figure 11:
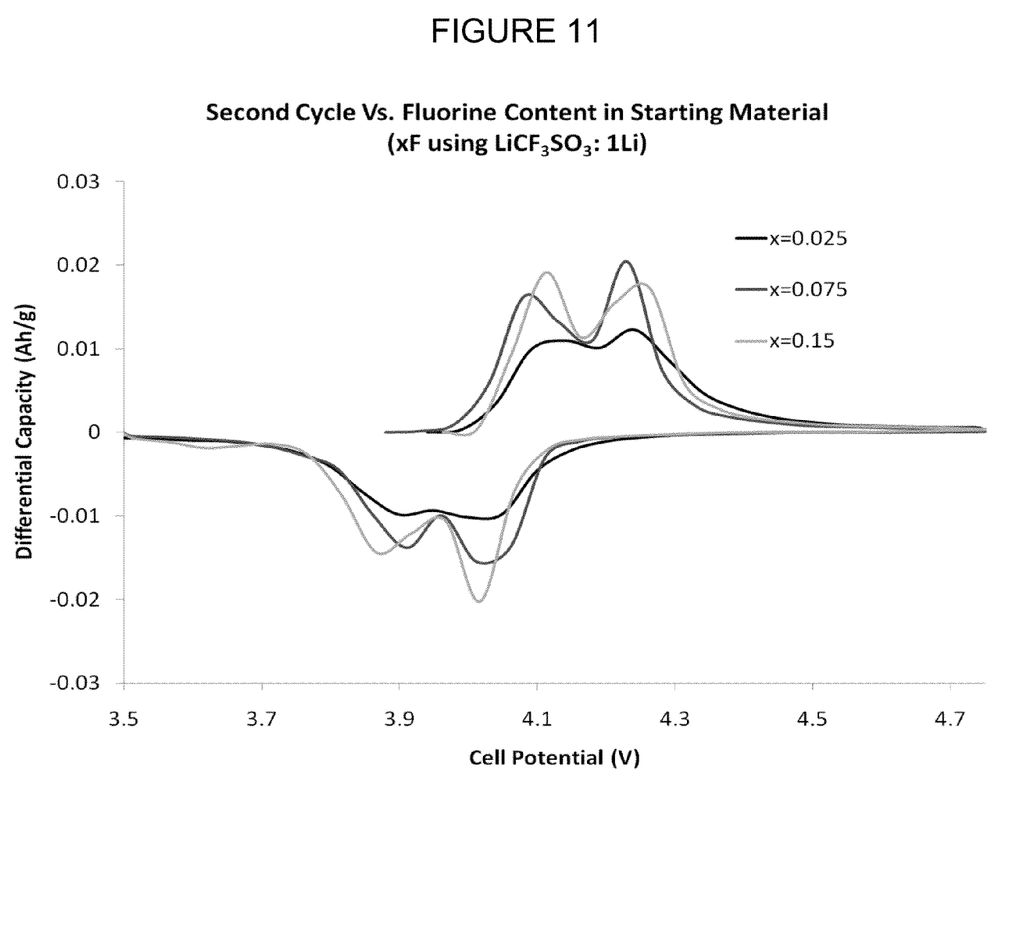
FIG. 11 is a graph illustrating the second cycle differential capacity traces for a lithium cell containing a fluorine-modified lithium manganese-based $AB_2O_4$ spinel according to an exemplary embodiment of the present disclosure.

FIGS. 8 through 11 and 13 show differential capacity data that provides information regarding the underlying thermodynamics and kinetics of an electrochemical cell. The differential capacity data uses galvanostatic control of the electrochemical system being tested, and plots the capacity increase (charge) or decrease (discharge) as a function of potential. FIG. 8 shows exemplary forming cycle (i.e., the first cycle) differential capacity traces for cells fabricated according to an exemplary method according to the present disclosure. FIG. 9 shows the differential capacity traces for the second cycle for the same cells. FIG. 10 shows exemplary forming cycle (i.e., the first cycle) differential capacity traces for cells fabricated according to an exemplary method according to the present disclosure. FIG. 11 shows the differential capacity traces for the second cycle for the same cells. FIGS. 8 and 9 show data of the present disclosure where lithium trifluoroacetate (LiC$_2$F$_3$O$_2$) was used in the starting materials and FIGS. 10 and 11 shows data of the present disclosure where lithium trifluoromethanesulfonate (LiCF$_3$SO$_3$) was used in the starting materials. FIG. 13 shows exemplary differential capacity traces for conventional lithium manganese-based AB$_2$O$_4$ spinel materials (fabricated according to conventional methods) cycled between 3.5 and 4.75 volts. Based on the data in FIGS. 8 through 11 and 13, the method provided in the present disclosure produces fluorine-modified lithium manganese-based AB$_2$O$_4$ spinel materials having differential capacity characteristics comparable to lithium manganese-based AB$_2$O$_4$ spinel materials fabricated using conventional methods.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method of preparing a fluorine-modified lithium manganese-based AB$_2$O$_4$ spinel cathode material via a solid state reaction, the method comprising:
   mixing a fluorine-containing lithium organic salt in a solid state, a manganese compound in a solid state, and a lithium compound in a solid state to produce a homogenous solid mixture; and
   calcining the homogenous solid mixture for a time period no greater than 4 hours at a temperature of at least 350° C.

2. The method according to claim 1, wherein the fluorine-containing lithium organic salt is a compound selected from a group consisting of lithium trifluoroacetate (LiC$_2$F$_3$O$_2$) and lithium trifluoromethanesulfonate (LiCF$_3$SO$_3$), lithium perfluoroorganoacetate, and lithium perfluoroorganosulfonate.

3. The method according to claim 1, wherein the manganese compound is a compound selected from a group consisting of MnO$_2$, Mn$_2$O$_3$, Mn$_3$O$_4$, manganese nitrate, manganese hydroxide, and manganese acetate.

4. The method according to claim 1, wherein the lithium compound is a compound selected from a group consisting of Li$_2$CO$_3$, LiOH, Li$_2$O$_2$, and Li$_2$O.

5. The method according to claim 1, further comprising grinding or milling the homogenous mixture.

6. The method according to claim 1, further comprising mixing the homogenous mixture with a conductive carbon and a binder.

* * * * *